United States Patent

[11] 3,573,739

[72] Inventor Richard A. Zeitlin
Bronx, N.Y.
[21] Appl. No. 722,980
[22] Filed Apr. 22, 1968
[45] Patented Apr. 6, 1971
[73] Assignee Autolectron Corp.
New York, N.Y.

[54] AUTOMATIC REGISTRATION SYSTEM
11 Claims, 10 Drawing Figs.

[52] U.S. Cl. .......... 340/172.5
[51] Int. Cl. .......... G06f 3/00, G06f 15/24, G11b 13/00
[50] Field of Search .......... 340/172.5; 235/157; 179/6.3, 6.3 (CC), 2 (CA); 235/61.6, 61.11; 340/147, 150; 340/149 (A), 152

[56] References Cited

UNITED STATES PATENTS

| | | | |
|---|---|---|---|
| 2,918,654 | 12/1959 | Hillyer | 340/150 |
| 3,099,512 | 7/1963 | Kohler | 340/172.5 |
| 3,187,334 | 6/1965 | Humphrey | 340/150 |
| 3,303,472 | 2/1967 | Chalker, Jr. et al. | 340/172.5 |
| 3,335,407 | 8/1967 | Lange et al. | 340/172.5 |
| 3,351,912 | 11/1967 | Collom et al. | 340/172.5 |
| 3,395,245 | 7/1968 | Harris | 340/147X |
| 3,504,346 | 3/1970 | Parsons et al. | 340/172.5 |
| 3,509,539 | 4/1970 | Fichten et al. | 340/172.5 |
| 3,181,124 | 4/1965 | Hammel | 340/172.5 |
| 3,451,043 | 6/1969 | Krause | 340/152 |

*Primary Examiner*—Paul J. Henon
*Assistant Examiner*—Melvin B. Chapnick
*Attorneys*—Lawrence I. Lerner, Sidney David and Joseph S. Littenberg

ABSTRACT: A computer compatible system with apparatus for the automatic registration of status information of persons or articles; the automatic registration and assignment of a portable device to a particular person or place; the registration of ancillary data pertaining to persons or articles; and the retrieval of all such information and data; wherein access to a remote memory device is provided at a plurality of locations, each location independently operable through a time multiplexed scanning system.

INVENTOR
RICHARD A. ZEITLIN
BY
ATTORNEY

PATENTED APR 6 1971

3,573,739

INVENTOR.
RICHARD A. ZEITLIN

BY [signature]
ATTORNEY

SYSTEM BLOCK DIAGRAM

CENTRAL CONTROL & MEMORY

INVENTOR.
RICHARD A. ZEITLIN

BY [signature]

ATTORNEY

BASIC ENTRANCE STATION - CARD INPUT & RCVRS

INPUT SECTION

BASIC ENTRANCE STATION

OUTPUT SECTION

INVENTOR.
RICHARD A. ZEITLIN

BY [signature]

ATTORNEY

INVENTOR.
RICHARD A. ZEITLIN

BY [signature]

ATTORNEY

AUTOMATIC REGISTRATION SYSTEM

BACKGROUND OF THE INVENTION

There are known systems which provide registration and message facilities for personnel, and also give a visual indication of the status of persons, and indications of messages.

For example, there are available systems for the registration of a given number of persons; registration of a single message per person; and for the registration of devices such as a pocket radio paging receiver to such persons.

However, most such systems require that the device or receiver by permanently assigned to a person or persons, or assigned by manually registering same by such person, or registered at a central location, upon request of that person.

Some systems provide for the registration, at a remote entrance station, of a person to a receiver. However, such systems require the manual operation of a series of thumb wheel switches to accomplish such registration and also that the user of the device register his OUT status from the same station at which he registered his IN status, and return his receiver to the same place from which it was obtained. Other shortcomings of such systems are the inexactitude of such method of registration and the likelihood of error arising therefrom and the exposure of such stations and devices to tampering, intentional or otherwise, by unauthorized personnel.

In addition, such systems require the installation of a fixed number of specific receiver storage cubicles at each entrance, each cubicle associated with a specific receiver, and each cubicle wired to a remotely located indicator device; and therefore they do not permit the random transfer of receivers from one station to another as needs may require.

Existing systems generally consist of electromechanical components and, therefore, function with limited speed, and are generally unable to cope with large peak loads such as that generated with a large number of stations or a rapid change in personnel status.

Likewise such units are not reasonably "computer compatible." That is, they are not capable of facilitating the transfer of information to a local or remote computer, at such speeds or with the degree of reliability required for efficient computer operation.

In addition, prior art units, when interfaced with radio-paging equipment, necessitate that the type of information-storage apparatus be disproportionately large and expensive and, also, slow in operation.

Further, most such systems are used in hospitals and because of the limitations imposed by cost and complexity, are purchased and installed for use by visiting staff physicians only, for the registrations of their status in combination with a limited number of receivers.

SUMMARY

Therefore, it is an object of this invention to provide a method and apparatus for the automatic registration of the status of a person or persons, and the automatic registration and assignment of a portable device to a particular person or place.

It is another object hereof, to provide a system which permits the random selection of a device such as a radio receiver for automatic registration and assignment thereof to any person or place, through operation of any station in the system and for deregistration thereof through operation of the same or any other station.

Also, it is an object of this invention to store the information relating to such registration of persons or devices, and deregistration thereof, and also to store other selected data for automatic indication or READOUT upon interrogation of the system either upon registration, deregistration or otherwise, as desired, through operation of any random station.

Another object is to provide one or more central control stations all of which may make corrections or additions to the information stored and/or interrogate and retrieve such information, as desired.

It is a further object to provide, in the apparatus of this invention, means for the automatic paging, from any central control station, of all, any, or a selected group of registered receivers, as desired.

Another object of the present invention is to provide a system that is "computer compatible," that is, a system to facilitate the transfer of information from any of a plurality of access stations to a local or remote computer at such speeds and with the reliability required for efficient computer operation. Also, it is an object to provide in such a system at least the following capabilities:

*a.* Capacity to store status information relating to a large number of persons, places and objects—3,000 and more.

*b.* Capacity for a relatively large quantity of data, such as, but not limited to message pertaining to each of such persons, places or objects—six or more to each.

*c.* Capable of integration with the radio-paging system of any manufacture.

*d.* A large number of access stations and associated memory access channels.

*e.* Suitable to modular solid-state construction.

*f.* Of error detecting fail-safe design wherever appropriate.

*g.* Providing the above capabilities and expansion thereof at lowest possible cost.

An important primary object of this invention is to provide an information storage and retrieval system, having facilities of multiple access for the entry, display and identification of desired information, having a large capacity to accommodate status and other data, such as, but not limited to messages and suitable for integration with all available radio paging systems (radio receivers) and able to facilitate the transfer of information to and from a local or remote computer at a speed and with reliability equal to such computers, and all without requiring any special programming.

Another object is to provide a system of multiple access suitable for the registration of persons, objects, and places, the registrations of data pertaining to each; the registrations of objects to persons or places; and to provide other services such as: inventory controls and the registrations of data pertaining to inventory; and the registrations of status and data pertaining to hospital patients and beds; and the retrieval and display of such information.

STill another object is to provide a system of modular construction to facilitate expansion and/or the substitution or elimination of access stations.

The system thus constitutes a memory-buss branching from a facility for the central control and storage of information, and a plurality of devices (access stations) interconnected to said memory-buss for selective access to the storage facility.

The present system utilizes logical functions which may comprise individual printed-circuit cards thus resulting in a modular construction readily facilitating greater versatility by permitting change of the access stations. Thus, a single system of this invention may be used for doctor's registration, registration of other personnel, radio paging of selected personnel, inventory control, bed status, patient status, or other like purposes.

Other objects of the present invention will become apparent upon the reading of the following specification and referring to the accompanying drawings, which form a material part of the disclosure.

The invention accordingly consists in the features of construction, combinations of elements, and arrangements of parts, which will be exemplified in the construction hereinafter described, and of which the scope will be indicated by the appended claims.

Figure 8:
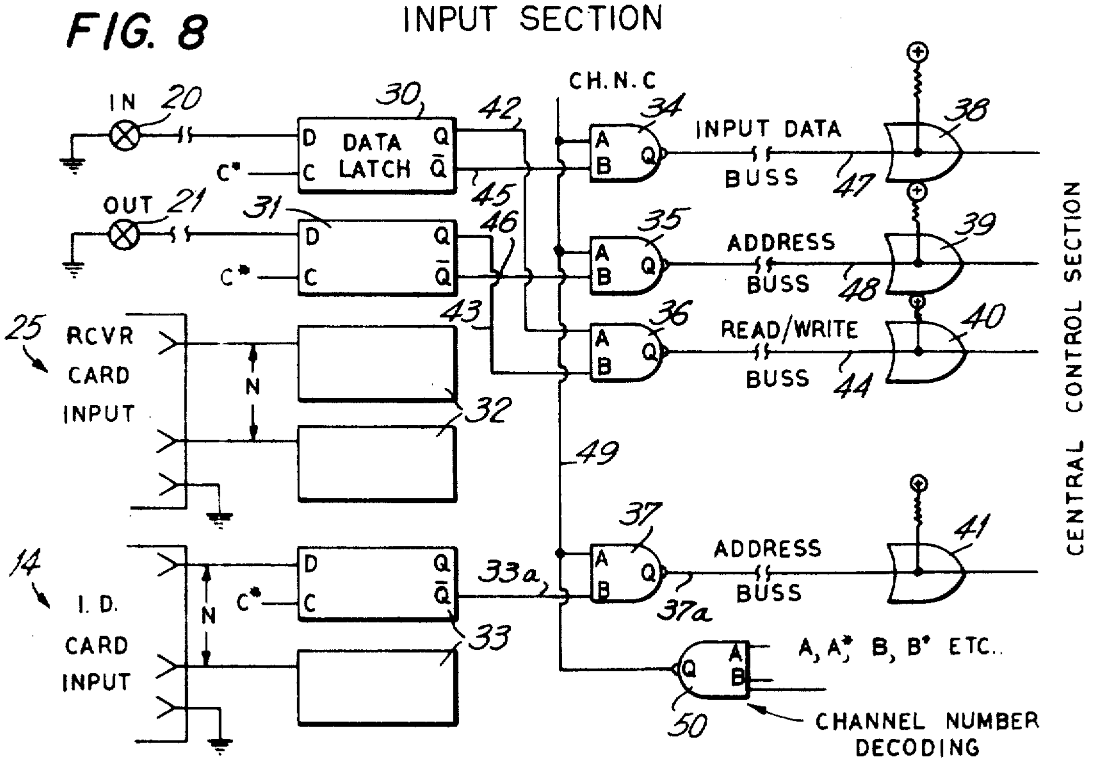
Figure 9:
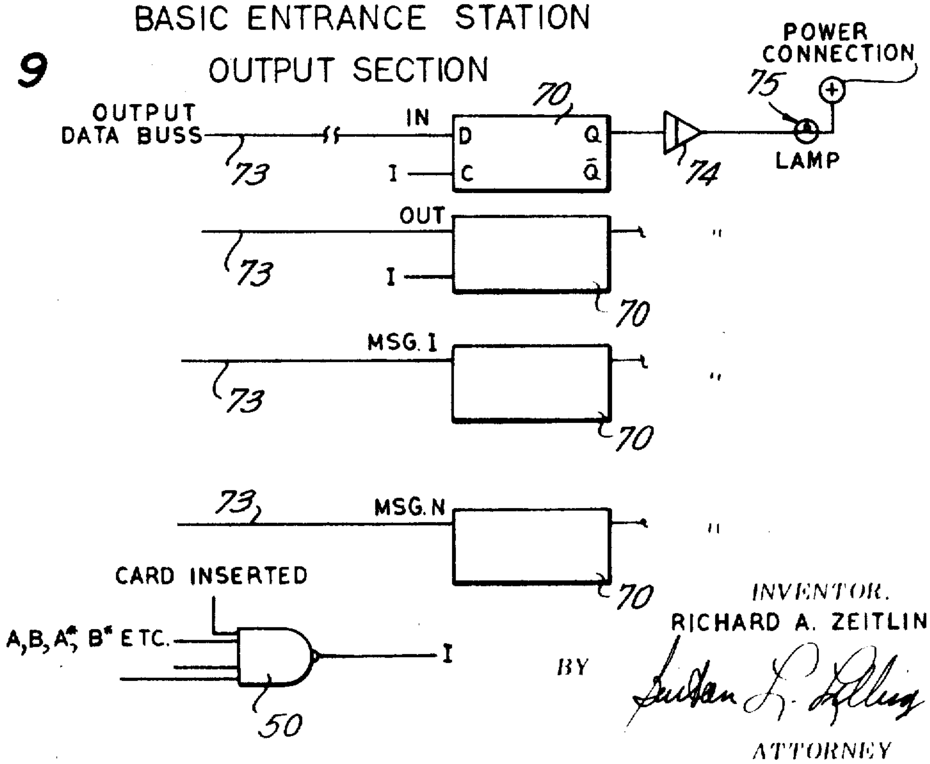
Figure 10:
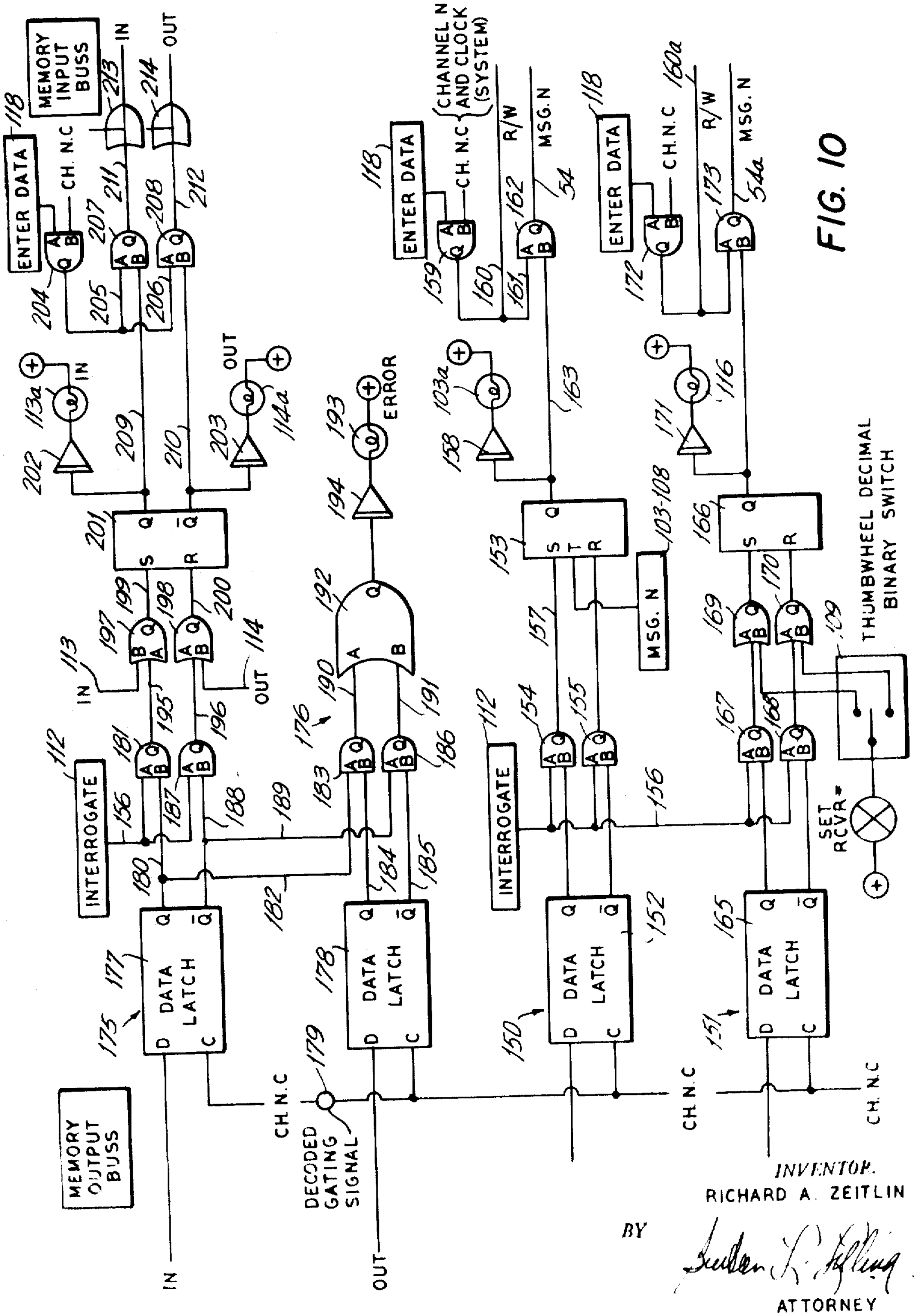

FIG. 8 comprises a logical schematic diagram of a possible embodiment of the input section of an entrance station constructed in accordance with the teachings of the present invention;

FIG. 9 comprises a logical schematic diagram of the output section of the entrance station of FIG. 8; and FIG. 10 comprises a composite logical schematic diagram of a possible embodiment of an operator's control station constructed in accordance with the teachings of the present invention.

DESCRIPTION OF THE PREFERRED EMBODIMENT

Figure 6:
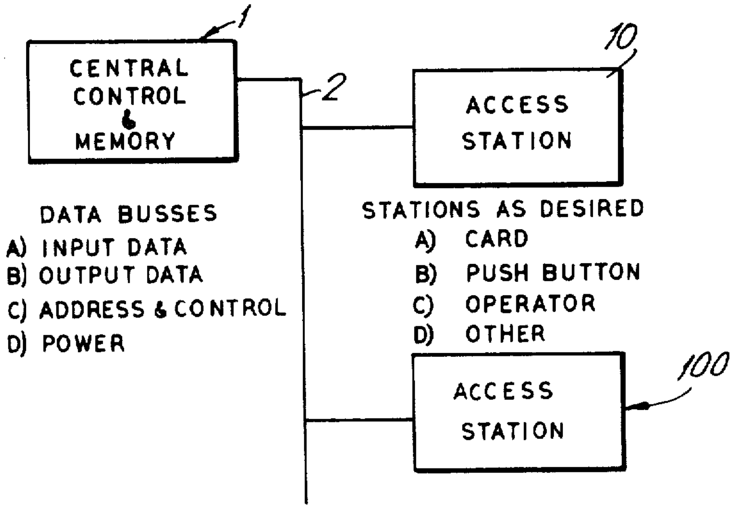
FIG. 6 is a block diagram of the system of the present invention.

Referring initially to FIG. 6, a system block diagram is there shown and will include a central control and memory section generally designated 1, a buss system 2 comprising data busses to a desired number of access stations, which in any system will include at least one entrance station 10 and one operator's control station 100. The buss system 2 will include busses for input and output data, address, control and power.

The individual access stations may be actuable by a variety of means, as by punched cards, printed circuit cards, push buttons, dials or any combination of such.

As will hereafter appear, the operator's station 100 will be advantageously manually operable by a combination of push buttons and thumb wheel switches, while the entrance station 10 is operable by a combination of punched and printed circuit cards.

With regard to the basic entrance station, the basic design of the apparatus of this invention provides for the use of punched cards or printed circuits associated with each of the persons, places or devices to be identified and registered. It will be appreciated however that instead of the input being provided from such punched cards or printed circuits, it may also be provided by a standard type of circuit board which converts keyboard closures, dial pulses, signals from thumb wheel switches or push buttons into logic levels in the desired format. In the preferred embodiment of this invention, however, punched cards and printed circuits have proved to be more advantageous in that their use eliminates the possibilities of error arising from the manual dialing or punching of numbers, and, because it provides for a faster means of entry of the desired data, and prevents registration by unauthorized personnel.

Referring now more particularly to FIGS. 1—4 of the drawing, an entrance station is there generally designated 10. The entrance station 10 provides merely the physical means for entering and reading data. The associated circuitry and its relationship to the system is more fully hereinafter described.

Persons using the entrance station 10 will be provided with an identification card 11 having a desired format of cutouts or through openings 12 which, when inserted between the contacts 13 of the card input or receptacle 14, will actuate a given number of data latches thus to enter a like number of bits to the memory and control section, as will appear later. The data thus entered may include the individual's code number, in this instance No. 4016 as shown on the card 11. It may also include data relating to the individual's assigned duties and the type of messages he is authorized to receive, and/or other pertinent desirable data.

After inserting the card 11 in the receptacle 14, the individual may interrogate the system, and ascertain which messages have been left for him, by depressing the INTERROGATE button 15. It will be appreciated that such interrogation may be accomplished automatically, if desired, by incorporating a limit switch, or the like, actuable upon insertion of a card 11 into the receptacle 14. Thereupon the appropriate lamp 16—19 will be illuminated to display any messages that may be stored for the individual code number in the memory system. Thereafter such information will be erased from the memory system, as will hereafter appear.

After inserting a card 11 into the receptacle 14, an individual may also register or change their IN or OUT status by pressing appropriately, button 20 to show IN status and button 21 for OUT status.

Likewise, after inserting the card 11 in the receptacle 14, an individual may cause a pocket page receiver 22 to be registered to their person by inserting the projecting portion 23, of the printed circuit card 24 affixed to said receiver, into the receiver card input or receptacle 25. Each printed circuit card 24 is coded with an electrical code circuit 26 which is unique to the receiver on which it is mounted. The code circuit 26 will be READ by contacts 27 in the receptacle 25 and the information transferred to the memory section, together with the person's status, as will appear presently.

Figure 7:
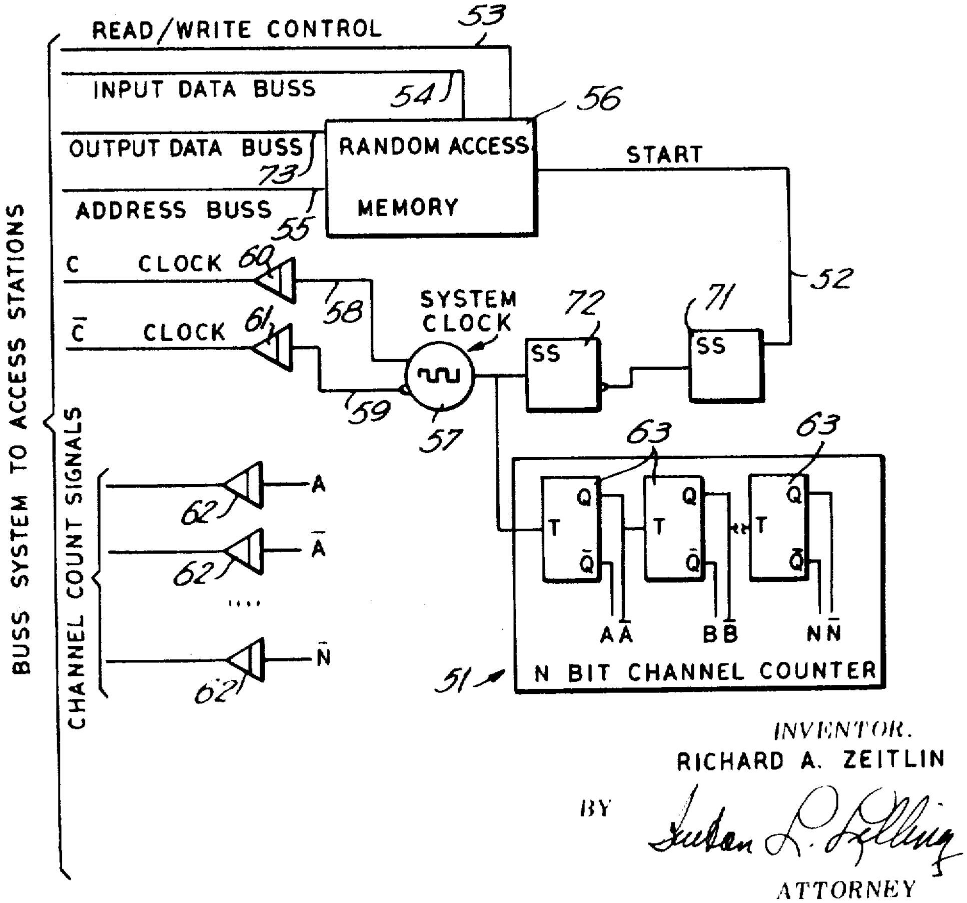
FIG. 7 is a logical schematic diagram of a central control and memory section that may be used in the system of the present invention.

Referring now to FIGS. 7—9, and initially to FIG. 8, the input section of a basic entrance station will have a data latch circuit for each binary digit or bit of information to be stored in memory and one for each bit of address code required.

More particularly, signals from the IN and OUT buttons 20 and 21 respectively will pass respectively to data latches 30 and 31. The input from the receiver card input 25 may include $n$ bits of information, each bit passing to a corresponding data latch 32. Likewise, the card input 14 will include $n$ data latches 33, one for each bit of address code required.

Each of the data latches 30—33 will be of a special type of flip-flop-inverter combination requiring only a single ended data input, D, and a clock input, C, the latter serving to enable a change in latch status. In order to afford sufficient time for all logic to stabilize before the memory is started, that is, for cards to be inserted at 14 and 25 and the appropriate button 20 or 21 depressed, the data latches are enabled during C* times, and the information read during C times.

To conserve space and for clarity of illustration, the circuit of latches 30, 31 and 33 only have been fully illustrated. It will be appreciated, however, that the circuits of the $n$ number of latches 32 and 33 are correspondingly identical to that shown for one of the latches 33.

Data from a selected access station will be gated onto the memory buss lines by a "wired-OR" function. More particularly, the output of latches 30—33 pass to corresponding NAND gates 34—37 and thence to corresponding "wired-OR" function 38—41 for gating to a corresponding memory input buss.

In operation, two variables are introduced at any entrance station 10. These are, the printed circuit 26 associated with a receiver 22 and the address information associated with an I.D. card 11. These variables and the IN-OUT status of an individual resolve into bits communicated as a signal at the terminal D of a corresponding data latch. The availability of the signal at D is controlled by a clock signal at C. A signal at both C and D will change the previous state of the output Q to correspond to that at D. Since Q emits a signal, it follows that no signal will emit at $\bar{Q}$.

With regard particularly to the data latches 30 and 31, associated with the IN-OUT status and buttons 20 and 21, respectively, actuation of button 20 will produce a signal at D of data latch 30 which, when enabled by clock C* will cause a signal to be present at terminal Q. The signal emitting at Q is carried by lead 42 to terminal A of NAND gate 36.

Analogously a signal at Q of latch 31 is carried by lead 43 to terminal B of gate 36. A signal at either A or B of gate 36 will produce a signal at the output Q thereof which is carried by lead 44 to the "wired-OR" function 40 for gating, in this instance, into the read/write control of the central control and memory.

The $\bar{Q}$ output of either data latch 30 or 31 will emit a signal whenever the latch is enabled by clock C and no signal is present at D. Therefore, except in the event of a malfunction, a signal will emit from the Q output of either latch 30 or 31 and appear at either terminal A or B respectively of gate 36 to enable writing the appropriate bit as to IN or OUT status into the memory. The $\bar{Q}$ output of the other of latch 30 or 31 will simultaneously emit a signal through conductor 45 or 46 respectively to the B terminal of either gate 34 or 35 respectively. If no signal is then present at the A terminals of gate 34 or 35 a signal will emit at the outputs Q of gate 34 or 35 for gating over conductors 47 and 48 through respective "wired-OR" functions 38 and/or 39.

With regard to the input data to the receiver card input 25 and I.D. card input 14 there will be a data latch associated with each bit of information. As stated previously, there may be *n* number of bits and a data latch and corresponding NAND gate associated with each of these inputs. By way of illustration, only two latches 32 have been shown in connection with the receiver card input 25 and two latches 33 in connection with the I.D. card input 14. The circuitry for each of the latches 32, 33, are identical to that shown for one of the latches 33.

In operation, the input to either of the latches 32 or 33 will produce a signal at the terminal D of a corresponding data latch 32, 33. The availability of the signal at D, as in latches 30 and 31, is controlled by a clock signal at C. A signal at both C and D will change the previous state of the output Q to correspond to that at D. Since Q emits a signal, it follows that the compliment thereof will emit at $\bar{Q}$. The output from the latch 33 will be carried by conductor 33*a* to the input B of NAND gate 37 and in analogous fashion, the output Q of NAND gate 37 will be carried by lead 37*a* to the "wired-OR" function 41 for gating, in this instance, into the address buss of the central control and memory.

The A terminals of gates 34, 35, 36 and 37, that is all gates connected to data latch $\bar{Q}$ outputs, are connected in parallel to conductor 49 which represents the selected channel or station. Channel selection or decoding is accomplished by inputs to terminals of NAND gate 50 from a channel counter 51 in the central control section (FIG. 7). Although only three inputs are shown, it will be understood that the number of inputs will be equal to the number of flip-flops in the channel counter 51. Gating will occur during the appropriate C time.

Referring now specifically to FIG. 7, the input data from the access stations will be received, as aforesaid, by the appropriate "wired-OR" function in to the appropriate busses; for read/write control 53, input data bass 54 and address buss 55; for storage in the random access magnetic core memory 56, which in one application of this invention is a VERSATORE II manufactured by Decision Control Corp. However, any suitable memory storage system may be employed.

It will be appreciated that NAND gate 36 will have no output at Q unless there is an input at either A or B. Therefore, the buss 44 will indicate a READ condition unless there is an input to either A or B of gate 36, and a WRITE condition when there is an input to either A or B.

The memory 56 will be activated by the activity at any access station. Two "single-shot multivibrators" 71 and 72 are connected to the output of the memory 56 by conductor 52. The said "single-shot multivibrators" emit a fixed length pulse upon actuation of the input to generate a start signal to the system at a period of time after the data has stabilized. The system clock 57 serves to activate the C and $\bar{C}$ inputs over conductors 58 and 59 respectively. Power drivers 60 and 61 are inserted in each line respectively to amplify the clock output signal.

All signals distributed from the central control and memory section are sent from a respective power driver.

The channel counter 51 is provided with N RST flip-flops 63 where $N=Log_2$ (number of channels + ).

The out put of each flip-flop 63 will reverse its previous state, (i.e. from Q to $\bar{Q}$ vice versa), upon any signal to input T.

As aforesaid the outputs from the channel counter 51 will impart an appropriate signal through gate 50 of the selected channel.

All interconnections of channel counter 51 are shown, and terminals properly identified. The output terminals of each flip-flop 63 are designated as A and $\bar{A}$, B and $\bar{B}$, etc. Input terminals of power drivers 62 are also designated as $\bar{A}$ and A, B and $\bar{B}$, etc., indicating the interconnecting circuitry. The inputs to the terminals A, $\bar{A}$, B, $\bar{B}$, etc., of the NAND gate 50 emanate from the output of the power drivers 62.

Referring now to FIG. 9, the output section of a basic entrance station 10 will comprise a data latch for each bit of data to be displayed. More specifically, a data latch and lamp will be associated with both the IN and OUT buttons 20 and 21, respectively and each message unit 16—19. For ease of illustration and clarity of understanding only the data latch and lamp associated with the IN status button are shown in detail. It will be appreciated, however, that such illustration is typical for each bit to be displayed.

The data latch circuit 70 of the output section is enabled by an input signal at C which is derived from the input section of the station. More specifically, the latches 70 are updated during the proper C* time if and only if an I.D. card is inserted at 14. The signal derived is gated by the NAND gate 50, as previously mentioned in connection with input section of FIG. 8.

Any signal from the output data buss 73 of the memory core 56 will appear at the input D of the appropriate latch. A corresponding output at Q feeds a lamp driver 74 to illuminate the corresponding lamp 75. Upon deactivation there will occur a change in the previous state of the latch output. Of course, if there was no signal to input D the latch will not be activated and no activation of the lamp will occur.

Figure 1:
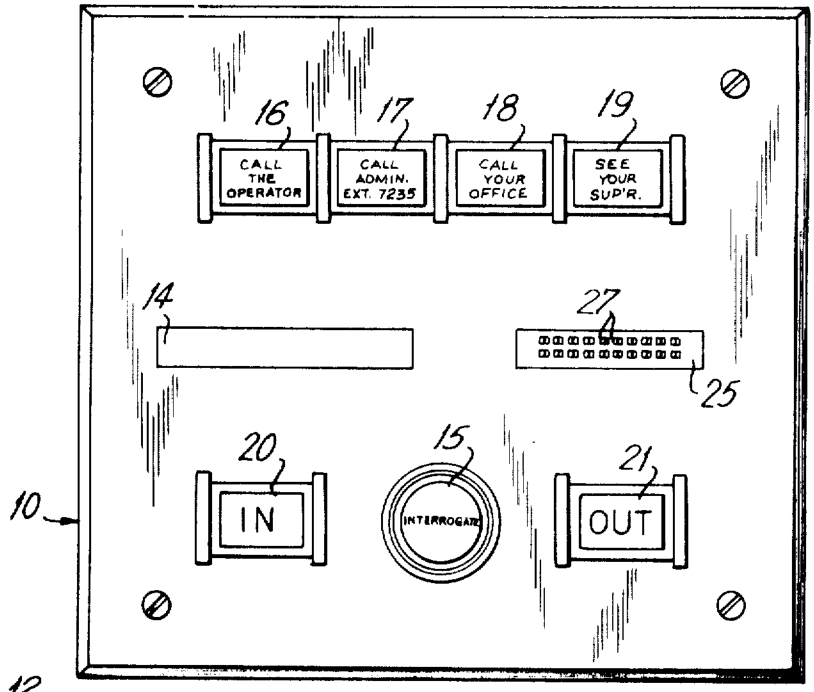
FIG. 1 is a front elevational view of a basic entrance station facilitating access to the system of this invention.
Figures 2, 3:
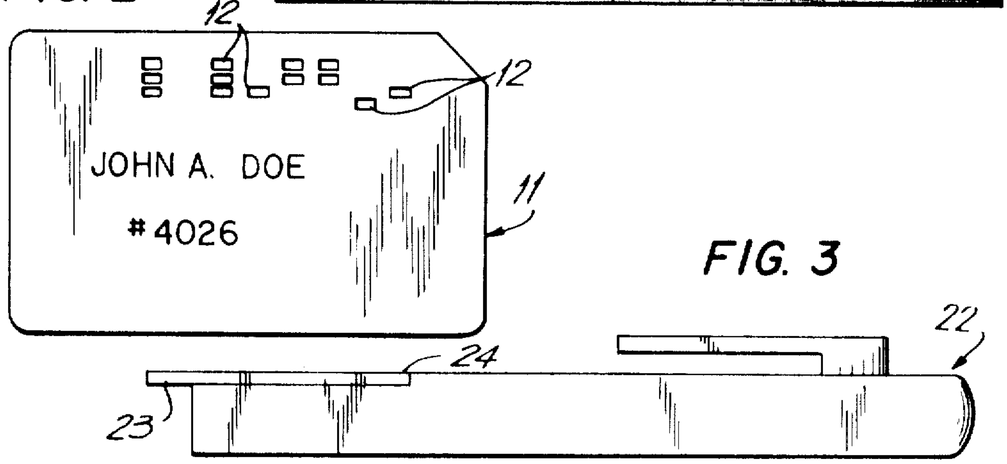
FIG. 2 is a top plan view of an identification card which may be used in conjunction with the entrance station of FIG. 1.
FIG. 3 is a side elevational view depicting schematically a portable radio paging receiver and the associated means for registration of same.
Figure 4:
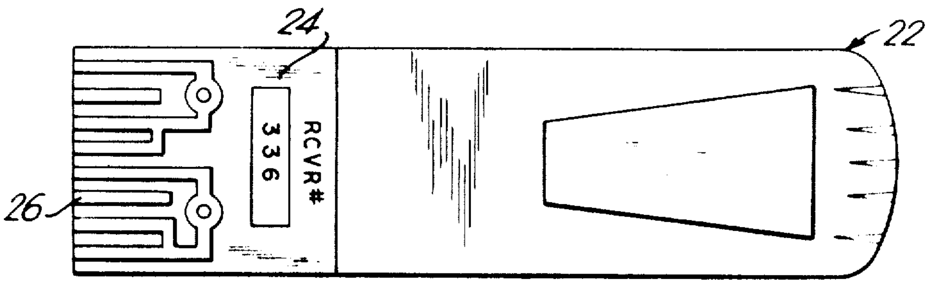
FIG. 4 is a plan view of the back side of the receiver of FIG. 3.
Figure 5:
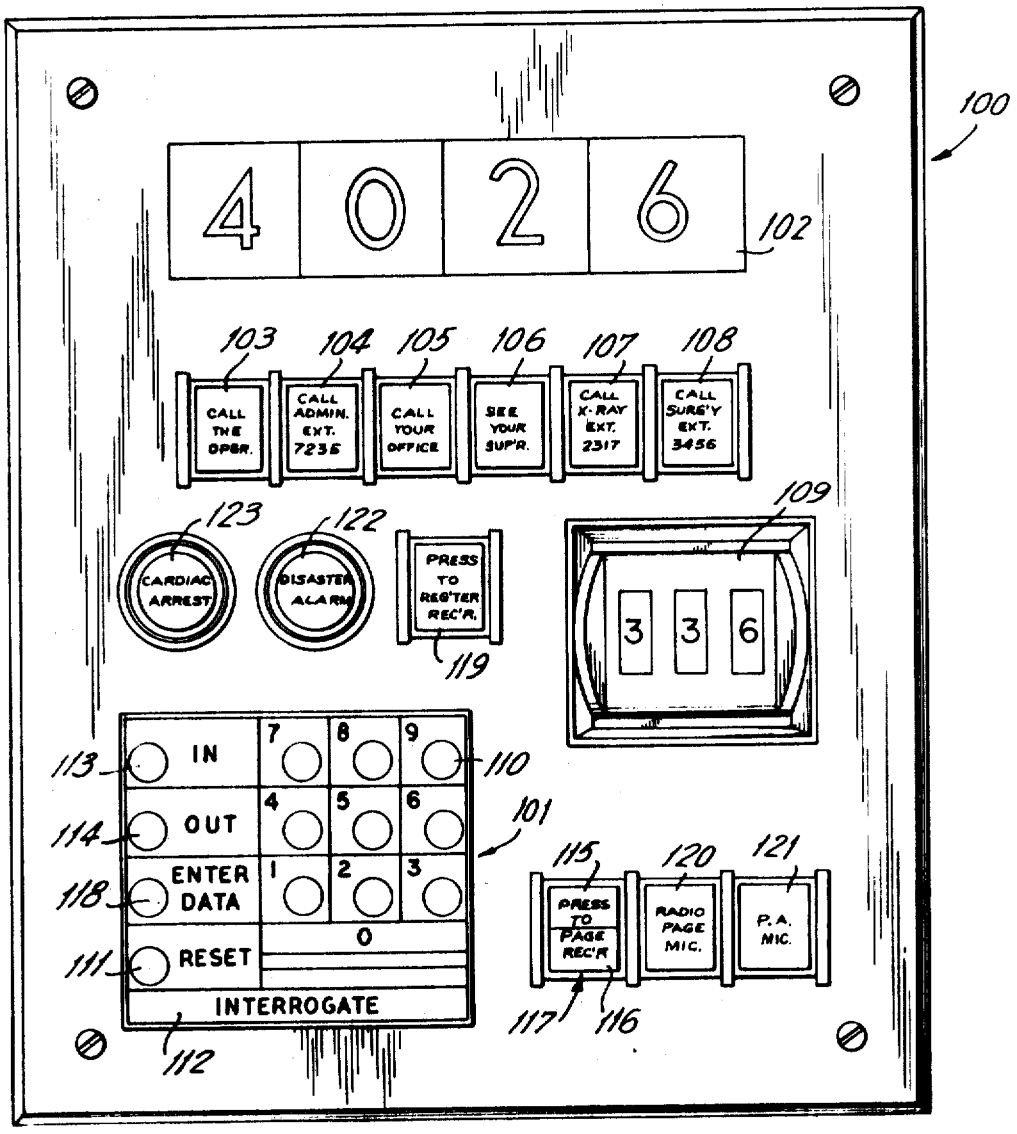
FIG. 5 is a front elevational view of an operator's station to facilitate access to the system of the invention.

Referring now to FIG. 5, the control panel of an operator's station is there generally designated 100 and includes an address and status control panel 101, an address indicator panel 102, message indicator light buttons 103—108, a thumb wheel selector switch 109 and optional additional auxiliary control buttons, hereinafter described.

The main function of the operator's station 100 is to:

A. Interrogate status of registrants

B. Initiate radio page

C. Manually change the status of a registrant and/or to register a receiver.

In operation, the system may be interrogated, a page initiated or registration may be accomplished by manual operation of the numbered buttons 110 of the 10-key keyboard closures (not shown) which are converted by a standard type of circuit board into logic levels in the desired format. The individuals corresponding call numbers will be illuminated at 102.

In the event of error, the reset button 111 may be actuated to erase previous call data.

The system may then be interrogated by actuation of the push bar 112. Thereupon, the applicable lights 103*a* and 108*a* associated with indicator light buttons 103—108 will become illuminated and likewise the lamps associated with the IN status button 113, the OUT status button 114 and the lamps 115 and 116 associated with button 117, thereby indicating all the information in memory that pertains to the registrant.

In any situation, the appropriate message indicators 103-—108 may be illuminated. If registrant is IN without a receiver than 113 will illuminate. If IN with a receiver, then 113 and 116 will be illuminated. If OUT then 114 will be illuminated.

The button 117 is provided with two lamps 115 and 116, as aforesaid. If 116 is lit and 115 is not, then paging may be initiated by depressing button 117. If lamp 115 is illuminated it will indicate that a page which may have emanated from another station is in progress.

If individual is in without a receiver, or not in, the operator may put a message into memory by depressing the appropriate button 103—108. In like manner a message may be erased from memory, same being accomplished by thus actuating the corresponding flip-flop circuit which serves to reverse the message signal.

The RESET button 111 merely extinguishes the lamps but will not change the information in the memory. If no changes in status or messages are to be made then the RESET button 111 and ENTER DATA button 118 serve the same function. If any data is to be changed then ENTER DATA button 118 must be pressed and then all data previously stored and not changed and/or any newly added data, also represented by appropriately illuminated buttons, will be stored in memory.

In addition any receiver 22 may be registered to any individual. This is accomplished by setting the thumb wheel selector switch 109 to the proper receiver number. Registration is completed by pressing the button 119. No lamp need be associated with button 119. In practice the selector switch 109 is set to the appropriate receiver number and then 113 and 119 pressed to register receiver and IN status. Thereafter 118 is pressed to ENTER DATA thus completing registration.

It will be appreciated that button 119 and associated circuit may be eliminated by providing a selector switch 109 with an automatic ZERO reset or by otherwise assuring that the switch is reset to ZERO after each use.

Alternatively a 10-button pannellike 101 and display like 102 may be used instead of a thumb wheel selector switch thereby assuring a ZERO reset and thus eliminating the need for button 119 and associated circuit.

The control panel 100 may alternatively have other convenience buttons to actuate circuitry for RADIO PAGE MICROPHONE 120, PUBLIC ADDRESS MICROPHONE 121, DISASTER ALARM 122 and CARDIAC ARREST team 123.

Appropriate circuitry may provide for automatic paging through pocket receivers of a selected group of individuals, whose I.D. Cards may be appropriately coded, as, for example, a cardiac arrest team.

Referring now to FIG. 10, there is shown a composite logical schematic diagram of the circuitry associated with each operator's control station.

The address portion of the operator's station is substantially the same as that for the entrance station (FIG. 8), except that the input derives from the pushbuttons 110 rather than the I.D. cards 11. Other portions of the circuitry are modified to afford to the operator control over all the data in memory, rather than a selected portion.

The message section 150 and the receiver number section 151 are very similar. Both consist of sections to retrieve the desired information from the system memory, hold it, and display it. In addition, circuitry is included to allow the operator to change information selectively, and then store the revised information in memory without the necessity for manually entering all the information to be stored.

In both the message section 150 and the receiver number section 151, the data stored in the memory is received by data latches actuated at the appropriate times by a decoded gating signal.

In the message 150 the data from the data latch 152 is transferred to a flip-flop circuit 153 upon the operators depression of the INTERROGATE button 112 thereby actuating the appropriate transfer AND gate 154 or 155. To illustrate, a signal at Q of latch 152 will produce a signal at B of AND gate 154. Actuation of INTERROGATE button 112 passes a signal through conductor 156 and to the input A of all the AND gates connected in parallel thereto. Thus inputs A and B of gate 154 will receive a signal thereby producing a signal at output Q which passes through conductor 157 to input S of flip-flop 153. The output of flip-flop 153 may be reversed by imparting a pulse to trigger input terminal T upon actuation of a message indicator light buttons 103—108. The output of the flip-flop 153 is monitored by light 103a associated with message indicator light button 103 on the operator's panel, driven from the flip-flop by power drivers 158.

In like fashion a signal at $\bar{Q}$ of latch 152 will produce a signal at B of AND gate 155 which will be gated in analogous manner to input R of flip-flop 153.

When the operator has set or altered the displayed information to the desired configuration, storage of the information is accomplished by depressing the ENTER DATA button 118, which occurs as follows. A signal is imparted from button 118 to A input of AND gate 159. A signal from the system clock 57 is imparted to input B thereof, thereby producing a signal at output Q.

The signal at Q of gate 159 passes through parallel conductors 160 and 161, conductor 160 passing to the read/write input buss and 161 to input A of AND gate 162. The output signal of flip-flop 153 will pass through conductor 163 to input B thereby actuating gate 162 to pass a signal to the memory input buss 54 by means of a "wired-OR" function (not shown).

In the receiver number section 151 the data from the data latch 165 is transferred to a flip-flop circuit 166 likewise upon depression of the INTERROGATE button 112. However, double gating is provided between the latch 165 and the flip-flop 166, to permit a change in the status of the flip-flop 166 through the direct action of the thumb wheel decimal decoding switch 109 which is coupled to the appropriate SET and RESET inputs (S and R, respectively) thereof.

More specifically, a signal at Q or $\bar{Q}$ output of latch 165 will be gated through AND gates 167 and 168, respectively, as the case may be, in like manner as the signal is gated from latch 152 through gates 154 or 155.

The signals from the Q outputs of gates 167 and 168 will pass, however, to the A input of OR gates 169 or 170, respectively, thereby producing a signal at output Q for passage to input S or R, as the case may be, of flip-flop 166. The status of flip-flop 166 may be changed by action of the thumb wheel switch 109 to thus emit a signal at the appropriate input B of OR gates 169 or 170. Such signal will be emitted from the Q output of the appropriate gate 169 or 170 to the respectively corresponding input S or R of flip-flop 166, thereby establishing the required status.

The output of flip-flop 166 is likewise monitored by a lamp 116 on the operator's panel, driven from the flip-flop 166 by a power driver 171.

As in the message section 150, data is entered by pressing button 118 which actuates the AND gates 172 and 173 in like fashion as gates 159 and 162 thus to pass an appropriate signal to the read/write input buss 160a and to the memory input buss 54a by means of an appropriate "wired-OR" function (not shown).

The circuit 175 for the IN-OUT function is slightly different than the circuits for the message section 150 and receiver number section 151 inasmuch as the IN status and OUT status are separate conditions that never occur simultaneously. Therefore, although the information is stored in two bits of the memory word, it is controlled by a single flip-flop circuit. The output of the data latch for the IN data serves to set the flip-flop circuit, and the output of the flip-flop serves to store both the IN and OUT bits in the memory word. The outputs of the OUT data latch and the IN data latch are combined in an error-detecting circuit 176 which actuates an alarm if an indicated status is both IN and OUT or neither IN nor OUT. Thus, as aforesaid, the system is provided with means for fail-safe operation in that an error in status will be indicated to the operator at the station 100. More specifically, the circuit 175 comprises a data latch 177 for the IN data and a data latch 178 for the OUT data. The input C of each data latch is derived from the system clock 57 which is controlled by a decoded gating signal 179. The input D derives from the output data buss 73 of the memory core 56. Where a signal appears at both inputs D and C, the output signal will appear at Q. Thus, assuming a previous IN status, signals will appear at inputs D and C of latch 177 at the opposite time. The output at Q will be communicated through conductor 180 to the input B of the AND gate 181 and by a parallel conductor 182 to the input A of AND gate 183. Under the same status condition there will be no signal at the D input of latch 178 and, therefore, no signal at the output Q thereof. Since the output Q of data latch 178 is connected to the input B of AND gate 183, by conductor 184, there will be no signal at the B input of gate 183.

Rather there will be an output at $\bar{Q}$ of latch 178 which is communicated by conductor 185 to the input B of AND gate 186.

Assuming now an opposite condition of status, that is an OUT status, there would be no signal to the D input of latch 177 and, therefore, no signal at the output Q thereof. Rather there will be an output signal at $\bar{Q}$ which is communicated to the B input of AND gate 187 through conductor 188. This same signal will be communicated through the parallel conductor 189 to the A input of gate 186.

It will thus be seen that is there is an error in the system, that is if the indicated status is both IN and OUT, such an error may be detected in the following manner. For example, if the error derives from an indicated status of both IN and OUT then signals will appear at the inputs D of both latches 177 and 178 and both latches will emit signals at Q thereof which will appear at the A and B input respectively of the AND gate 183 thereby emitting a signal at the Q output thereof.

If the indicated status is neither IN nor OUT then there will be no signal at the D inputs of latches 177 and 178 and, therefore, signals will be emitted from the $\bar{Q}$ outputs which will be communicated to the A and B inputs, respectively of AND gate 186.

Since the Q outputs of AND gates 183 and 186 are connected by conductors 190 and 191 to inputs A and B, respectively of OR gate 192, it will be apparent that either failure will cause a signal at the input, either A or B, of OR gate 192 thus causing a signal to emit from the Q output of gate 192 which is monitored by a lamp or buzzer 193 on the operator's panel. Such output may be driven by a power driver 194.

Referring again now to circuit 175, it will be apparent that depending upon the IN or OUT status of an individual there will be a signal at the B inputs of either AND gate 181 or 187 as the case may be. As in the previous sections 150 and 151, either AND gate 181 or 187 will be actuated upon depression of the INTERROGATE button 112, depending upon which of the two gates has a signal at input B. This will occur because the actuation of the INTERROGATE button 112 will cause a signal to be carried by the conductor 156 to the inputs A of both gates 181 and 187.

The signals from the Q outputs of gates 181 and 187 will pass by conductors 195 and 196 respectively to the A input of OR gates 197 or 198, respectively, thereby producing a signal at the respective Q output for passage through conductors 199 or 200 to the S or R input, as the case may be, of flip-flop 201.

The status of the flip-flop 201 may be changed by depression of either the IN button 113 or the OUT button 114 on the operator's panel 100 to thus emit a signal at the input B of the corresponding OR gate 197 or 198. Such signal will be emitted from the Q output of the appropriate gate 197 or 198 to the respectively corresponding input S or R of flip-flop 201, thereby establishing a desired status or changing the previous status.

The outputs of flip-flop 201 is monitored by lamps **113*a* from the Q output thereof and 114*a* from the $\bar{Q}$ output thereof, each driven by a power driver 202 and 203**, respectively.

As in sections 150 and 151, after the operator has set or altered the displayed information to the desired configuration, storage of the information is accomplished by depressing the ENTER DATA button 118, which is accomplished as follows. A signal is imparted from the button 118 to the A input of AND gate 204. A signal from the system clock 57 and the channel counter 51 is imparted to the input B thereof, thereby producing a signal at output Q. The signal at the Q output of gate 204 passes through parallel conductors 205 and 206, conductor 205 passing a signal to the A input of AND gate 207 and conductor 206 to the A input of AND gate 208. The output signals from Q or $\bar{Q}$ of flip-flop 201 will pass through either conductor 209 or 210 respectively to the B inputs of gates 207 or 208, as the case may be. Since a signal will appear at inputs A of both gates 207 and 208, then whichever of the two said gates receives a signal at the B input will emit a signal from its respective Q output which will pass through conductors 211 or 212 respectively to the memory input buss by means of the "wired-OR" functions 213 or 214.

From the foregoing it will be appreciated that the system as herein described provides for an addressing scheme arranged in such a manner that the computer or central control and memory section can request the information desired in a format compatible with the programming schemes of any type of computer thereby facilitating access of information without the need for any auxiliary computers or special programming techniques.

Although the central control and memory section has been described herein as having a random access magnetic core memory, it will be appreciated that any type of random access memory is compatible with and may be used in connection with the apparatus of this invention. Also, the system, as herein described, contemplates a slot in the memory for each person and associated means to register an object to a person. However, in other embodiments of this invention a slot may be provided for each object and the persons may alternatively be registered to an object.

Further it will be appreciated that although the embodiment described herein includes data latches, NAND gates, AND gates, and "wired-OR" functions, that any of the specific devices or functions mentioned may be substituted by any of a variety of known devices and functions for accomplishing the same purpose. More specifically, in lieu of the data latches mentioned, a variety of bistable circuit means may be utilized to perform the same function, which is to temporarily store the data associated with a given status and to make that information available to the central control and memory section. It will be appreciated also that the data latches herein referred to are one form of a flip-flop circuit. In addition, the NAND gates, AND gates and "wired-OR" functions provided for herein are merely one combination of the variety of gating means that may be utilized to select data for transmission from the storage means to the said central control and memory section.

Further it will be appreciated that the entrance station and operator's station as described herein serve merely as means to enter data into the system or alter the data already in the system and/or display the data therein, and that such stations may take a variety of forms.

More specifically either of the input means to the entrance station may comprise a key or card having either a series of punched holes, a variety of indentations or projections or a card having predetermined pattern of conductive contacts. Also the input means in the entrance station may be substituted with a 10-key keyboard or decimal switch and likewise the 10-key keyboard and/or the decimal switch in the operator's station may be substituted with either of said key or card input means. In addition, any of these means may be replaced by a rotary telephone type dial switch likewise convertible into logic levels in the desired format.

While the device of the instant invention has been primarily developed and employed for use in registration of status and for the automatic paging of individuals, it is appreciated that the instant system and apparatus is capable of many varied applications, all of which are intended to be comprehended herein.

From the foregoing, it is seen that the instant system and apparatus fully accomplish their intended objects and are well adapted to meet practical conditions of manufacture, installation and use.

Although the present invention has been described in some detail by way of illustration and example for purposes of clarity of understanding, it is understood that certain changes and modifications may be made within the spirit of the invention and scope of the appended claims.

I claim:

1. A system for storing and retrieving information relating to the presence or absence of predetermined individuals from a facility, and the status of predetermined articles related to said facility for facilitating temporary arbitrary association of any one of said individuals with any one of said articles said system including:

a plurality of access stations distributed about said facility, each being responsive at a first predetermined data entry point to a first multibit data input in a format related to said predetermined individuals and being responsive at a second predetermined data entry point to a second multibit data input in a format related to said predetermined articles for providing a multibit data signal indicating said arbitrary association of one of said individuals with one of said articles;

a memory selectively responsive to said multibit data signal in accordance with an IN signal and an OUT signal, said memory storing said multibit data signal in response to said IN signal and removing said multibit data signal, if already contained therein in response to said OUT signal so that the association of any one of said predetermined individuals with any one of said articles may be entered for storage or removed from storage in said memory; and means located at each of said access stations for selectively providing said IN signal and said OUT signal so that said arbitrary association can be established at any of said plurality of access stations and said arbitrary association can be disestablished at the same or any other of said plurality of access stations.

2. A system as described in claim 1 in which said first predetermined entry point is actuated by a card having a plurality of recesses therein.

3. The system as defined in claim 2 in which said second predetermined entry point is actuated by conductive patterns on a printed circuit card.

4. The system as defined in claim 3 and also including:

a radio receiver having an edge; and means for affixing said printed-circuit card to said radio receiver with said conductive patterns extending beyond said edge for contacting said second predetermined entry point.

5. The system as defined in claim 1 in which said first predetermined entry point is actuated by a decimal switch.

6. The system as defined in claim 1 in which said first predetermined entry point is actuated by operation of a 10-key keyboard.

7. The system as defined in claim 1 in which said first predetermined entry point is actuated by operation of a rotary dial switch.

8. The system as defined in claim 1 in which said second predetermined entry point is responsive to a printed-circuit card having conductive patterns thereon.

9. The system as defined in claim 8 also including:

a radio receiver having an edge; and means for affixing said printed-circuit card to said radio receiver with said conductive patterns extending beyond said edge for contacting said second predetermined entry point.

10. The system as defined in claim 1 also including:

means responsive to a third multibit data input in a format related to said predetermined individuals for selectively retrieving data from said memory related to the arbitrary association of said predetermined individuals with said predetermined radio receivers.

11. The system as defined in claim 1 in which said predetermined articles are radio receivers.